United States Patent Office 3,080,428
Patented Mar. 5, 1963

3,080,428
POLYHALOPROPYL ETHERS AND PROCESS
FOR MAKING THEM
Viktor Weinmayr, Landenberg, Pa., assignor to E. I. du Pont de Nemours and Company, Wilmington, Del., a corporation of Delaware
No Drawing. Filed July 20, 1960, Ser. No. 44,019
13 Claims. (Cl. 260—614)

This invention relates to certain new symmetrical polyhalopropyl ethers in which at least one halogen is fluorine and to a novel process for making them.

Halogenated ethers are known to be valuable for a wide variety of purposes. In general, those which contain fluorine are unsymmetrical and/or are completely halogenated. Heretofore, symmetrical partially halogenated ethers containing fluorine, particularly the symmetrical partially halogenated propyl ethers, have been unknown and it has not been known how to prepare them.

It is an object of this invention to provide a novel class of symmetrical partially halogenated propyl ethers containing at least one fluorine atom in the 3 position which are valuable for a wide variety of purposes. Another object is to provide a novel process for the preparation of such ethers. A further object is to provide such a process which can be readily carried out and controlled to produce a polyhalopropyl ether of such class as the predominant product. A particular object is to provide such a process which employs readily available starting materials and produces the ethers in high yields and high purity and which can be practiced on a large scale without undue hazards. Other objects are to produce new compositions of matter and advance the art. Still other objects will appear hereinafter.

The above and other objects may be accomplished in accord with this invention which comprises the novel class of symmetrical polyhalopropyl ethers of the formula $(CXYFCHXCH_2)_2O$ wherein each X is a member of the group consisting of hydrogen, chlorine and fluorine and Y is a halogen of an atomic number of from 9 to 17 and the process for preparing such ethers which comprises reacting about 2 moles of a haloethylene of the formula $CXY=CHX$, wherein each X is a member of the group consisting of hydrogen, chlorine and fluorine and Y is a halogen of an atomic number of from 9 to 17, with 2 moles of formaldehyde in the presence of at least 2 moles of hydrogen fluoride at a temperature of from about —50° C. to about 200° C.

The process of this invention is simple and easily carried out at low or moderate temperatures and pressures and produces the desired ethers in high yield and high purity from readily available starting materials. The process does not require any catalyst but takes place readily and at satisfactory rates in the absence of any added catalytic material.

The symmetrical polyhalopropyl ethers of this invention are new chemical compounds which are useful for a variety of purposes. They are noninflammable, noncorrosive, and stable. For example, symmetrical 3,3,3-trifluoropropyl ether on a watch glass could not be ignited with a match and, when it was maintained in the presence of copper, aluminum and mild steel at 130° F. for 60 days, it was not deleteriously affected, did not corrode the aluminum or the steel, and caused only a slight tarnishing of the copper. They are useful as hydraulic fluids, heat transfer agents, reaction media, and solvents. They are of special value as selective solvents for the separation of the components of mixtures of high molecular weight highly fluorinated organic compounds into constituents of different fluorine content having different properties, and particularly for highly fluorinated copper phthalocyanines. They are also particularly valuable as polyhalopropylating agents for aromatic compounds such as benzene and naphthalene, e.g., for introducing the corresponding polyhalopropyl groups into aromatic hydrocarbons. Furthermore, the ethers of this invention are intermediates for the preparation of the corresponding polyhalopropyl alcohols and may be converted to such alcohols by well-known chemical methods, such as treating them with concentrated sulfuric acid or concentrated phosphoric acid at elevated temperatures.

The haloethylenes which are employed in the process of this invention are well known compounds and are represented by the general formula $CXY=CHX$ wherein each X is a member of the group consisting of hydrogen, chlorine and fluorine, which may be the same or different, and Y is a halogen of an atomic number of from 9 to 17. Preferred classes of haloethylenes are those having the general formula $CXY=CHX$ and $CXY=CH_2$ wherein each of X and Y is a halogen of an atomic number of from 9 to 17.

The reaction taking place to produce the symmetrical ethers of this invention may be represented, with 1,1-difluoroethylene as the haloethylene reactant, by the following equation:

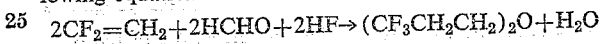

This reaction appears to be specific to the haloethylenes above defined and is not a general reaction. For example, when unsubstituted ethylene was employed in the process of this invention, it did not produce an ether but produced 1,3-dioxane. When 1,2-dibromoethylene was employed as the haloethylene reactant in the process of this invention, it failed to react with the formaldehyde and the hydrogen fluoride. When tetrafluoroethylene is employed as the haloethylene reactant, it produces fluoromethyl 2,2,3,3,3-pentafluoropropyl ether ($CH_2FOCH_2CF_2CF_3$) and 1H,1H-pentafluoro-1-propanol ($CF_3CF_2CH_2OH$) as disclosed in my copending application Serial No. 814,415, filed May 20, 1959, and now Patent No. 2,992,276, and did not form a symmetrical polyhalopropyl ether of the present invention.

Representative haloethylenes that may be reacted with formaldehyde and hydrogen fluoride to produce the symmetrical polyhalopropyl ethers of this invention are listed below, together with the particular symmetrical polyhalopropyl ether produced from each of them.

Fluoroethylene ($CHF=CH_2$) → 3,3-difluoropropyl ether ($CHF_2CH_2CH_2)_2O$
1,1-difluoroethylene ($CF_2=CH_2$) → 3,3,3-trifluoropropyl ether ($CF_3CH_2CH_2)_2O$
Trifluoroethylene ($CF_2=CHF$) → 2,3,3,3-tetrafluoropropyl ether ($CF_3CHFCH_2)_2O$
Chloroethylene ($CHCl=CH_2$) → 3-chloro-3-fluoropropyl ether ($CHClFCH_2CH_2)_2O$
1,1-dichloroethylene ($CCl_2=CH_2$) → 3,3-dichloro-3-fluoropropyl ether ($CCl_2FCH_2CH_2)_2O$
1,2-dichloroethylene ($CHCl=CHCl$) → 2,3-dichloro-3-fluoropropyl ether ($CHClFCHClCH_2)_2O$
Trichloroethylene ($CCl_2=CHCl$) → 2,3,3-trichloro-3-fluoropropyl ether ($CCl_2FCHClCH_2)_2O$
1-chloro-1-fluoroethylene ($CClF=CH_2$) → 3-chloro-3,3-difluoropropyl ether ($CClF_2CH_2CH_2)_2O$
1,1-dichlorofluoroethylene ($CCl_2=CHF$) → 3,3-dichloro-2,3-difluoropropyl ether ($CCl_2FCHFCH_2)_2O$
1,2-dichlorofluoroethylene ($CClF=CHCl$) → 2,3-dichloro-3,3-difluoropropyl ether ($CClF_2CHClCH_2)_2O$
2-chloro-1,1-difluoroethylene ($CF_2=CHCl$) → 2-chloro-3,3,3-trifluoropropyl ether ($CF_3CHClCH_2)_2O$ The formaldehyde may be used in its unpolymerized form or in the form of one of its polymers, such as paraformaldehyde and trioxane, without affecting the rate or the course of the reaction. For ease of handling and for economic reasons, the formaldehyde ordinarily will be in the form of paraformaldehyde.

Preferably, the hydrogen fluoride will be anhydrous hydrogen fluoride. This is for practical reasons, such as keeping the corrosion of the equipment at a minimum. It is unnecessary to employ special precautions to maintain anhydrous conditions for the reaction to proceed satisfactorily. Water is formed as a product of the reaction. Aqueous hydrofluoric acid of 75% concentration or higher may be used. More dilute hydrofluoric acid tends to cause excessive decrease in the yield of the desired products. The anhydrous hydrogen fluoride need not be completely pure; commercial anhydrous hydrogen fluoride, which contains traces of sulfur compounds, is satisfactory.

The amount of haloethylene required for the reaction is 2 moles per 2 moles of formaldehyde and at least 2 moles of hydrogen fluoride. Less than this amount of haloethylene results in a corresponding decrease in the production of the desired product from a given amount of formaldehyde, and more than this amount comprises an excess of the haloethylene which reacts with the excess hydrogen fluoride to produce a fluorine-containing polyhaloethane.

Although the stoichiometric equation for the reaction of this process requires only 2 moles of hydrogen fluoride for each 2 moles of formaldehyde, an excess of hydrogen fluoride which acts as a solvent for the formaldehyde and provides a reaction medium is normally employed. Usually, about 2 moles to about 10 moles of hydrogen fluoride for each mole of formaldehyde, preferably about 5 to about 7 moles of hydrogen fluoride, will be employed.

The reaction may be carried out at temperatures in the range of from about −50° C. to about 200° C. For a smooth, controlled reaction with high conversion and yield, the temperature usually will be in the range of from about 0° C. to about 100° C., preferably from about 10° C. to about 60° C. The reaction will take place at temperatures below −50° C. but the reaction rate is decreased and there is no technical need or economic justification for maintaining such low temperatures for the reaction. Also, there is no advantage in conducting the reaction above 100° C., although temperatures up to about 200° C. may be employed, if desired. When it is desired to carry out the process at atmospheric pressure, the temperatures should be maintained at about 10° C. or below, preferably from about 0° C. to about 10° C.

Preferably, the reaction is carried out at atmospheric pressure. In a closed reaction vessel, the pressure will depend partly upon the vapor pressure and amount of the haloethylene charged to the reaction vessel and partly upon the temperature at which the reaction is run. Usually, the pressure will be the autogenous pressure at the temperature employed, i.e. from about 0 p.s.i.g. (pounds per square inch gauge) to about 3000 p.s.i.g.

The process of this invention is simple and readily carried out in conventional reaction vessels that may be cooled or heated and agitated and which will withstand the pressures that may be encountered in the reaction. The reaction vessel will be constructed of, or lined with, a material or materials that are resistant to the corrosive action of anhydrous hydrogen fluoride and/or concentrated solutions of hydrofluoric acid. Suitable materials of construction include platinum, silver, nickel, stainless steel, and "Hastelloy."

The process may be carried out as a batch process with the haloethylene continuously introduced into a solution of formaldehyde or of a polymer thereof in hydrogen fluoride until the formaldehyde is reacted, or with the total amount of haloethylene charged into the reaction vessel already containing the solution of formaldehyde or of its polymer in hydrogen fluoride, or as a continuous operation. In a continuous operation, for example, a stream of a solution of paraformaldehyde in anhydrous hydrogen fluoride and a stream of the haloethylene will be continuously introduced simultaneously into a reaction vessel maintained at the required reaction temperature and pressure, and a solution of the reaction products in hydrogen fluoride will be continuously withdrawn for continuous isolation of the products. In a batch process, the haloethylene is preferably introduced gradually or in small increments into the formaldehyde-hydrogen fluoride solution to avoid a rapid exothermic reaction from a mass of material that would cause the heat of reaction to build-up and make temperature and pressure control difficult.

The symmetrical polyhalopropyl ethers may be isolated by conventional methods such as washing with water or aqueous alkali, fractional distillation, and the like, preferred methods of isolation being illustrated in Examples 1 to 8 which are given hereinafter.

In order to more clearly illustrate this invention, preferred modes of practicing it and the advantageous results obtained thereby and to also illustrate representative uses of the novel ethers of this invention, the following examples are given in which the parts are by weight except where otherwise specifically indicated:

EXAMPLE 1

A one-liter stainless steel reaction vessel, fitted with a mechanical agitator, was charged with 120 g. of paraformaldehyde and 560 g. of anhydrous technical hydrogen fluoride. 1,1-difluoroethylene was continuously introduced into the agitated solution of paraformaldehyde in hydrogen fluoride at such a rate that the temperature of the reaction mass could be maintained between −10° C. and 6° C. by cooling the reaction vessel with a mixture of ice and salt. After about 45 minutes, gas started to be emitted from the reaction mass, indicating that the reaction to produce a polyfluoropropyl ether was nearing completion. The emitted gas was 1,1,1-trifluoroethane, formed by a reaction between the 1,1-difluoroethylene and the hydrogen fluoride after the paraformaldehyde had been essentially consumed by reaction with the haloethylene and hydrogen fluoride. When there was no further absorption of 1,1-difluoroethylene without the emission of gas from the reaction mass, a total of 270 parts of 1,1-difluoroethylene had been added. The reaction mass was then poured into 4 kg. of an ice and water mixture. The oil that separated was washed with water until essentially acid-free. It amounted to 321 g. By steam distillation of the oil, 279 g. of unrefined 3,3,3-trifluoropropyl ether, $(CF_3CH_2CH_2)_2O$, was obtained, 83% of which distilled upon fractionation at 114° C. to 115° C. at atmospheric pressure. The collected fractionated material was 3,3,3-trifluoropropyl ether of 99% purity. The purity was determined by vapor phase chromatography and the identity was established by elemental chemical analysis, infrared absorption, and nuclear magnetic resonance examination.

EXAMPLE 2

In the reaction vessel of Example 1, 1,1-difluoroethylene was continuously passed into a solution of 120 g. of paraformaldehyde in 500 g. of anhydrous technical hydrogen fluoride at −40° C., maintained with an acetone-solid carbon dioxide bath. After three hours reaction time, the paraformaldehyde was essentially consumed; gas was emitted from the reaction mass and comprised a mixture of 1,1,1-trifluoroethane and unreacted 1,1-difluoroethylene. The reaction mass was then poured into an ice-water mixture and 309 g. of an oil separated. After water washing and steam distilling this oily product, 300 g. of unrefined 3,3,3-trifluoropropyl ether was obtained.

EXAMPLE 3

In the reaction vessel of Example 1, 1,1-difluoroethylene was continuously passed into a solution of 120 g. of paraformaldehyde in 160 g. of anhydrous technical hydrogen fluoride maintained at 10° C. until absorption of the haloethylene by the reaction mass ceased and gas began to be emitted. Upon mixing the reaction mass with an ice-water mixture, 299 g. of oil separated. By steam distillation, 215 g. of unrefined 3,3,3-trifluoropropyl ether was isolated, of which 73% distilled at 114° C. to 115° C.

EXAMPLE 4

A 500 ml. pressure reactor, lined with "Hastelloy C," was charged with 190 g. of anhydrous technical hydrogen fluoride and 48 g. of paraformaldehyde, and the reactor and its contents were cooled to −60° C. To the reactor was then added quickly and in a single mass 206 g. of 1,1-difluoroethylene. The reactor was sealed, heated to 60° C., and kept under agitation for about one hour. Then the reactor and its contents were cooled to about 0° C., the reaction mass was poured into and mixed with ice and water, and 140 g. of oil separated. After water washing and steam distilling this oil, 106 g. of unrefined 3,3,3-trifluoropropyl ether had collected. By subsequent fractionation, pure 3,3,3-trifluoropropyl ether, having a boiling point of 114° C. to 115° C., was obtained.

EXAMPLE 5

Proceeding as in Example 4, the reactor was charged with 188 g. of an 80% aqueous hydrofluoric acid solution and 30 g. of paraformaldehyde and cooled to −60° C. To the reactor was then added a 200 g. quantity of 1,1-difluoroethylene. The reaction mass was heated at 80° C. for 2 hours, after which time the mass was cooled to about 0° C. and poured onto cracked ice. The 54 g. of oil that separated was steam distilled to yield 49 g. of unrefined 3,3,3-trifluoropropyl ether. Upon fractionation, 35 g. of pure material, having a boiling point of 114° C., was obtained.

EXAMPLE 6

A 500 ml. pressure reactor, lined with "Hastelloy C," was charged with 200 g. of anhydrous technical hydrogen fluoride and 30 g. of paraformaldehyde and cooled to −40° C. Then a 150 g. quantity of fluoroethylene was added to the reactor. Within 5 minutes, the temperature of the reaction mass rose to 65° C., owing to the heat of reaction. The reaction mass was cooled to 0° C. and poured onto cracked ice. The separated oil was water-washed and steam distilled to produce 63 g. of non-aqueous distillate. Upon fractionation, 37 g. of 3,3-difluoropropyl ether $(CHF_2CH_2CH_2)_2O$, having a boiling point of 147° C., was obtained. The 3,3-difluoropropyl ether was identified by chemical, infrared, and nuclear magnetic resonance analyses.

EXAMPLE 7

A one-liter stainless steel reaction vessel, fitted with a mechanical agitator, was charged wtih 60 g. of paraformaldehyde and 500 g. of anhydrous technical hydrogen fluoride and cooled to about 5° C. Over a period of ninety minutes, 242 g. of 1,1-dichloroethylene were added to the reactor while the temperature of the agitated reaction mass was maintained between 5° C. and 10° C. The agitation was continued for about one hour after the addition of the 1,1-dichloroethylene was completed, while the temperature was kept at 10° C. to 12° C. The reaction mass was then poured onto cracked ice, and 198 g. of an oil separated. The oil was water washed and steam distilled, and 191 g. of a colorless oil was recovered. Upon fractionation, pure 3,3-dichloro-3-fluoropropyl ether $(CCl_2FCH_2CH_2)_2O$, having a boiling point of 119° C. at 19 mm. mercury pressure, was obtained. The identity of the ether was established by the analytical procedures used in the preceding examples.

EXAMPLE 8

A mixture of 600 g. anhydrous technical hydrogen fluoride, 30 g. of paraformaldehyde, and 260 g. of trichloroethylene was heated with agitation in a stainless steel pressure reactor at 50° C. for 6 hours. The reaction mass was then mixed with an ice and water mixture, whereupon 243 g. of a brown oil separated. After a preliminary purification by water washing and steam distilling, followed by a fractionation, pure 2,3,3-trichloro-3-fluoropropyl ether $(Cl_2FCHClCH_2)_2O$, having a boiling point of 100° C. at 3 mm. mercury pressure was obtained. The composition and structure of the product were determined by chemical, infrared, and nuclear magnetic resonance analyses.

EXAMPLE 9

*Alkylation of Benzene With 3,3,3-Trifluoropropyl Ether*

A mixture comprising 140 g. benzene, 150 g. of anhydrous technical hydrogen fluoride, and 52 g. of 3,3,3-trifluoropropyl ether was heated at 200° C. for six hours in a stainless steel pressure vessel. At the end of this time, the reactor and its contents were cooled to about 0° C. The reaction mass was poured onto cracked ice, and the separated benzene solution of the reaction product was steam distilled. The water-insoluble distillate was dried over anhydrous magnesium sulfate and then fractionated by distillation. After the benzene had distilled, some unreacted 3,3,3-trifluoropropyl ether was recovered, and, at 154° C., 3,3,3-trifluoropropylbenzene, identified by chemical analysis and nuclear magnetic resonance patterns, distilled and was collected.

EXAMPLE 10

*Separation of Fluorinated Copper Phthalocyanines*

A mixture of fluorinated copper phthalocyanines was prepared as described in my copending application, Serial No. 706,235, filed December 31, 1957, and now Patent No. 3,006,921. One part of copper phthalocyaninetetracarboxylic acid amide (made by the urea process from trimellitic acid and cuprous chloride), 15 parts of technical anhydrous hydrogen fluoride, and 8 parts of technical sulfur tetrachloride were charged into a stainless steel bomb which had been cooled in a Dry Ice-acetone mixture and had been swept with nitrogen. The bomb was closed and put into an oil bath where it could be agitated. The temperature of the oil bath was raised to 150° C., over a period of about four hours, and the bomb was agitated at an oil bath temperature of 150° C. to 155° C. for six hours. After cooling the bomb to room temperature, it was cooled further in iced water and the remaining pressure, mainly due to an excess of sulfur tetrafluoride, was released. The reaction mass was then poured onto about 200 parts of ice, filtered, washed nearly acid free, slurried in 200 parts of dilute aqueous ammonia to neutralize all hydrogen fluoride, filtered and washed again with water, and dried at 80° C. to 90° C. The deep blue solid thus obtained was extracted with acetone to give a blue solution. Upon evaporation of the acetone, one part of a mixture of copper polyfluoropoly-(trifluoromethyl)phthalocyanines was obtained.

This acetone-soluble mixture was heated at about 80° C. with symmetrical 3,3,3-trifluoropropyl ether. A green solution formed over insoluble material. The solution was filtered and its solids content recovered by evaporation. The 3,3,3-trifluoropropyl ether-insoluble portion of the starting mixture of fluorinated copper phthalocyanines was still soluble in acetone and partially soluble in benzene and produced blue solutions in these solvents. The fluoropropyl ether-soluble fraction dissolved in these solvents to give green-colored solutions. The reason for the different colors of the solutions lies in the difference in the fluorine content of the different fractions. The fluorinated copper phthalocyanines, that are insoluble in the 3,3,3-trifluoropropyl ether and produce blue solutions in acetone, had a nitrogen atom to fluorine atom ratio of 8:13, while the trifluoropropyl ether-soluble green solution material had a nitrogen to fluorine ratio of 8:18. The symmetrical 3,3,3-trifluoropropyl ether gave a distinctly cleaner separation of the mixture of fluorinated copper phthalocyanines than could be obtained with benzene. Also, symmetrical 2,3,3-trichloro-3-fluoropropyl ether was found to have a selective solvent action on said mixture of fluorinated copper phthalocyanines.

Also, for purposes of convenience, the haloethylenes, the amounts of the reagents, the conditions employed, and the products obtained in the examples, are summerized in the following Table I.

TABLE I

*Summary of Examples*

| Example | Ethylenic Reactant | Grams | HCHO, grams | HF, grams | Temp., °C. | Pressure | Product | B.P., °C. |
|---|---|---|---|---|---|---|---|---|
| 1 | 1,1-difluoro-ethylene | 271 | 120 | 560 | −10 to 6 | Atm | $(CF_3CH_2CH_2)_2O$ | 114–115. |
| 2 | do | | 120 | 500 | −40 | Atm | $(CF_3CH_2CH_2)_2O$ | 114–115. |
| 3 | do | | 120 | 160 | 10 | Atm | $(CF_3CH_2CH_2)_2O$ | 114–115. |
| 4 | do | 206 | 48 | 190 | 60 | Autogenous | $(CF_3CH_2CH_2)_2O$ | 114–115. |
| 5 | do | 200 | 30 | ¹188 | 80 | do | $(CF_3CH_2CH_2)_2O$ | 114–115. |
| 6 | Fluoroethylene | 150 | 130 | 200 | −40 to 65 | do | $(CHF_2CH_2CH_2)_2O$ | 147. |
| 7 | 1,1-dichloro-ethylene | 242 | 60 | 500 | 10 to 12 | Atm | $(CCl_2FCH_2CH_2)_2O$ | 119 at 19 mm. |
| 8 | Trichloroethylene | 260 | 30 | 600 | 50 | Autogenous | $(CCl_2FCHClCH_2)_2O$ | 100 at 3 mm. |
| 9 | Alkylation of benzene with 3,3,3-trifluoropropyl ether. | | | | | | | |
| 10 | Separation of fluorinated copper phthalocyanines. | | | | | | | |

¹ 80% hydrofluoric acid solution.

It will be understood that the preceding examples have been given for illustrative purposes solely and that this invention is not limited to the specific embodiments described therein. On the other hand, it will be readily apparent that, subject to the limitations set forth in the general description, many variations can be made in the materials, proportions, conditions, and techniques employed without departing from the spirit or scope of ths invention.

From the preceding description and examples, it will be apparent that this invention provides a novel process which is simple and easy to carry out on a large scale without undue hazards and which can be readily controlled to produce the desired products in high yields and purity from readily available starting materials. The invention further provides a novel class of symmetrical polyhalopropyl ethers which are valuable for a variety of useful purposes. Accordingly, it will be apparent that this invention constitutes a valuable advance in and contribution to the art.

The embodiments of the invention in which an exclusive property or privilege is claimed are defined as follows:

1. A symmetrical polyfluoropropyl ether of the formula $(CXF_2CHXCH_2)_2O$ wherein each X is a member of the group consisting of hydrogen and fluorine.
2. Symmetrical 2,3,3,3-tetrafluoropropyl ether.
3. Symmetrical 3,3,3-trifluoropropyl ether.
4. Symmetrical 3,3-difluoropropyl ether.
5. The process for preparing a symmetrical polyhalopropyl ether which comprises reacting about 2 moles of a haloethylene of the formula CXY=CHX, wherein each X is a member of the group consisting of hydrogen, chlorine and fluorine and Y is a halogen of an atomic number of from 9 to 17, with 2 moles of formaldehyde in the presence of at least 2 moles of hydrogen fluoride at a temperature of from about −50° C. to about 200° C.
6. The process for preparing a symmetrical polyhalopropyl ether which comprises reacting about 2 moles of a haloethylene of the formula CXY=CHX, wherein each X is a member of the group consisting of hydrogen, chlorine and fluorine and Y is a halogen of an atomic number of from 9 to 17, with 2 moles of formaldehyde in the presence of from about 5 to about 10 moles of anhydrous hydrogen fluoride at a temperature of from about −50° C. to about 200° C.
7. The process for preparing a symmetrical polyhalopropyl ether which comprises reacting about 2 moles of a haloethylene of the formula CXY=CHX, wherein each X and Y is a halogen of an atomic number of from 9 to 17, with 2 moles of formaldehyde in the presence of at least 2 moles of anhydrous hydrogen fluoride at a temperature of from about 0° C. to about 100° C.
8. The process for preparing a symmetrical polyhalopropyl ether which comprises reacting about 2 moles of a haloethylene of the formula CXY=CHX, wherein each X and Y is a halogen of an atomic number of from 9 to 17, with 2 moles of formaldehyde in the presence of from about 5 to about 10 moles of anhydrous hydrogen fluoride at a temperature of from about 0° C. to about 60° C.
9. The process for preparing a symmetrical polyhalopropyl ether which comprises reacting about 2 moles of trichloroethylene with 2 moles of formaldehyde in the presence of from 2 to about 10 moles of anhydrous hydrogen fluoride at a temperature of from about 0° C. to about 100° C.
10. The process for preparing a symmetrical polyhalopropyl ether which comprises reacting about 2 moles of a halo ethylene of the formula $CXY=CH_2$, wherein each of X and Y is a halogen of an atomic number of from 9 to 17, with 2 moles of formaldehyde in the presence of from 2 to about 10 moles of anhydrous hydrogen fluoride at a temperature of from about 0° C. to abot 100° C.
11. The process for preparing symmetrical 3,3,3-trifluoropropyl ether which comprises reacting 1,1-difluoroethylene with 2 moles of formaldehyde in the presence of at least 2 moles of hydrogen fluoride at a temperature of from about −50° C. to about 200° C.
12. The process for preparing symmetrical 3,3,3-trifluoropropyl ether which comprises reacting 1,1-difluoroethylene with 2 moles of formaldehyde in the persence of from 2 to about 10 moles of hydrogen fluoride at a temperature of from about 0° C. to about 100° C.
13. The process for preparing symmetrical 3,3,3-trifluoropropyl ether which comprises reacting 1,1-difluoroethylene with 2 moles of formaldehyde in the presence of from about 5 to about 10 moles of anhydrous hydrogen fluoride at a temperature of from about 0° C. to about 10° C. at atmospheric pressure.

References Cited in the file of this patent

UNITED STATES PATENTS 2,824,141  Zisman et al. _____ Feb. 18, 1958

OTHER REFERENCES

Thomas: Anhydrous Aluminum Chloride in Organic Chemistry (1941), page 878.

Prins: Recuel des Travaux Chimiques des Pay-Bas, 72 (1953), pages 551–557 and 867–877. (Copy in Library.)